H. L. TRAPHAGEN.
Curtain-Fixtures.
No. 135,950. Patented Feb. 18, 1873.
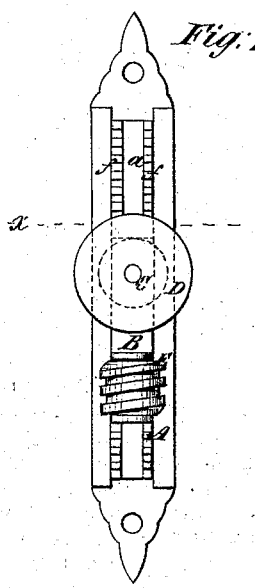
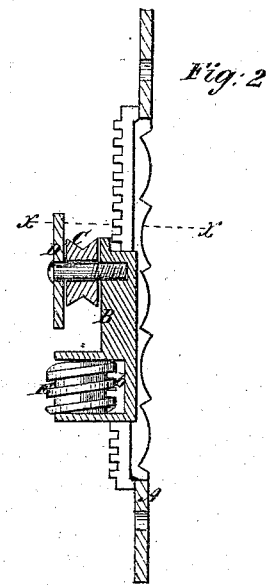
Witnesses:
Henry T. Brown
Fred Haynes
H. L. Traphagen

UNITED STATES PATENT OFFICE.

HENRY L. TRAPHAGEN, OF NEW YORK, N. Y., ASSIGNOR TO HIMSELF AND RUFUS N. PRATT, OF SAME PLACE.

IMPROVEMENT IN CURTAIN-FIXTURES.

Specification forming part of Letters Patent No. 135,950, dated February 18, 1873.

*To all whom it may concern:*

Be it known that I, H. L. TRAPHAGEN, of the city, county, and State of New York, have invented an Improvement in Shade-Cord Fixtures, of which the following is a specification:

The shade-cord fixture in common use is not susceptible of accurate adjustment to regulate the tension upon the cord.

The object of this invention is to provide a device in which the defects mentioned shall be wholly obviated, and which shall also possess the advantages of affording convenience for the slackening of the cord when desired, and will have its slide always securely locked in position, while it may be readily raised or lowered to permit the removal of the cord or its increased tension when necessary. The invention consists in the combination, with the usual slide and pulley, of an endless screw and fixed rack-teeth, whereby the requisite movement, with the advantages hereinbefore set forth, of the slide is provided for.

Figure 1 is a front or face view of a shade-cord fixture made according to my invention. Fig. 2 is a vertical longitudinal section, taken in a plane at right angles to Fig. 1. Fig. 3 is a transverse horizontal section, taken in the line $x\ x$ of Figs. 1 and 2.

A is the usual rack, shaped for attachment to the wooden frame, and carrying the slide B, moving in a slot, $a$, formed vertically or longitudinally in the rack, and being held therein by lateral longitudinal flanges $a'$ at its back, these flanges traversing within a cavity or groove, $c'$, in the back of the rack, as will be better seen by reference to Fig. 3. Upon the front face of this slide B, and at or near the upper end thereof, is the cord-pulley C, and external to this, and fixed upon the extremity of the pivot of the pulley, is the disk D. The lower end of the slide is enlarged and formed with a recess, $b$, for the reception of the endless screw E, which works on a vertical axis and gears into the series of teeth $f$ formed upon the face or front of the rack A, at either side of the slot $a$, as represented in Fig. 1. The shade-cord being passed around the pulley C in the usual manner, the turning of the screw in one direction or the other, the screw working as aforesaid in the fixed teeth $f$ on the rack, when attached to the window-frame, will, of course, raise or lower, as the case may be, the slide B and its attached pulley C, and, accordingly, diminish or increase the tension exerted upon the cord; this adjustment being capable of great accuracy, as the twist of the screw is such as to insure, by its frictional contact with the teeth $f$, its retention against turning, thus enabling the screw to be stopped and returned at any point in its revolution at which the desired tension upon the cord is obtained. It will furthermore be noticed that, inasmuch as the series of teeth $f$ extend, nearly the whole length of the rack, sufficient room for the movement of the slide is permitted to enable the pulley to be raised enough to permit the entire removal of the cord therefrom when, for any reason, such removal may be desired.

What I claim as my invention is—

The combination of the slide B carrying the pulley C and endless screw E with the rack A, furnished with the series of fixed teeth $f$, arranged on either side of its slot $a$, substantially as herein set forth, for the purpose specified.

H. L. TRAPHAGEN.

Witnesses:
 FRED. HAYNES,
 A. B. McNEIL.